Jan. 25, 1944.    H. E. SOMES    2,340,150
FAULT-TESTING ARTICLE OF ELECTRICALLY-CONDUCTIVE MATERIALS
Filed May 21, 1940
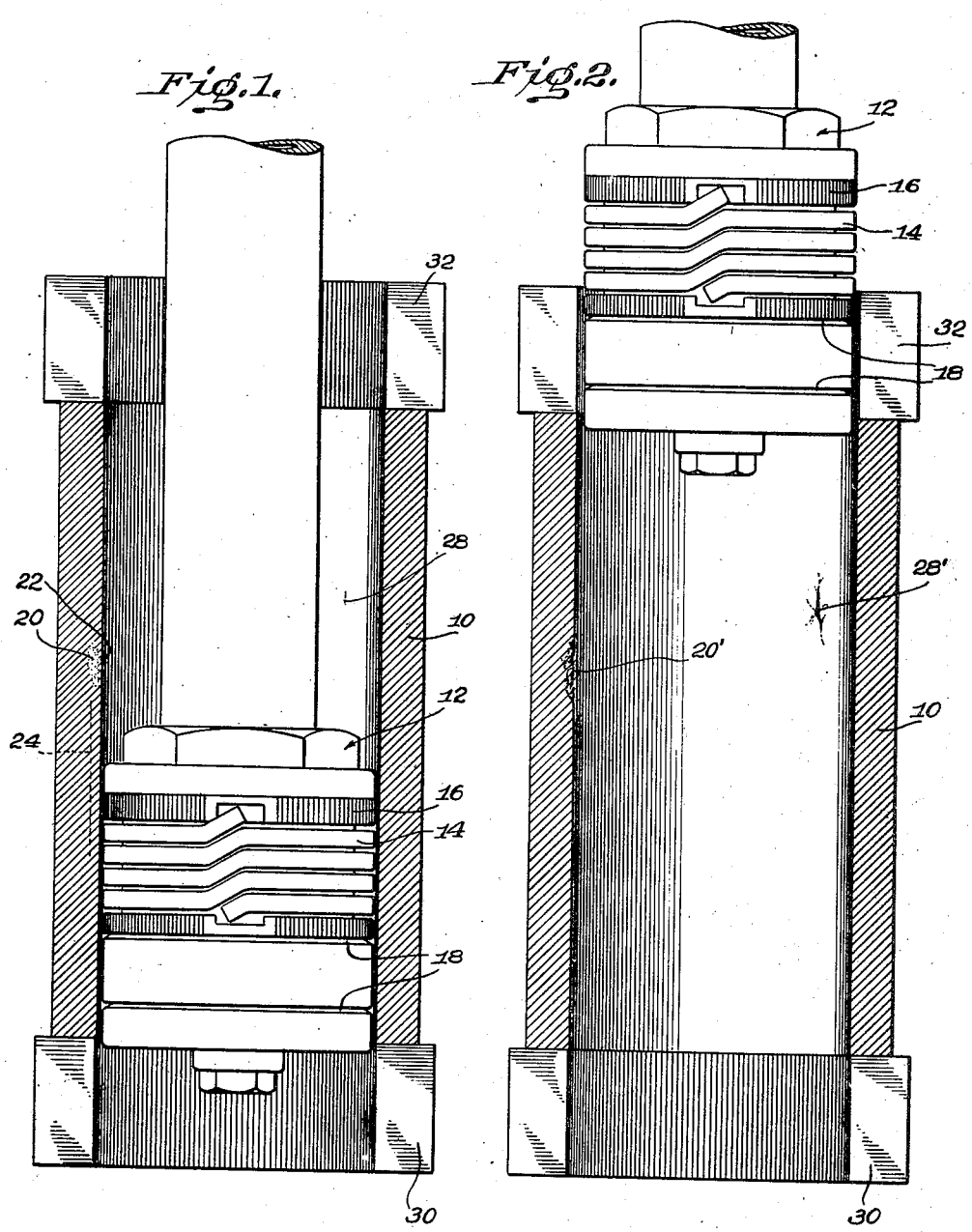
INVENTOR
*Howard E. Somes*
BY
ATTORNEY Patented Jan. 25, 1944

2,340,150

UNITED STATES PATENT OFFICE 2,340,150

FAULT-TESTING ARTICLES OF ELECTRICALLY CONDUCTIVE MATERIAL

Howard E. Somes, Detroit, Mich., assignor to Budd Induction Heating, Inc., Philadelphia, Pa., a corporation of Michigan Application May 21, 1940, Serial No. 336,364

3 Claims. (Cl. 73—51)

This invention relates to the testing of electrically conductive materials for structural weaknesses and mechanical faults, and more particularly to a method of testing metallic articles for structural flaws and defects which are not obvious upon the surface thereof.

An object of this invention is to provide an improved method of testing materials in which structural flaws and defects which are not obvious upon the surface are rendered discernible to simple visual inspection.

A further object is to provide a method of testing which is equally adaptable to exterior surfaces or to the inner bores of cylinders, hubs or other annular objects.

These and other objects are accomplished by the invention hereinafter described in connection with the accompanying drawing which illustrates more or less diagrammatically one means of carrying out the present invention.

In the drawing wherein like reference characters indicate like parts,

Figure 1 is illustrative of a tubular member shown in section together with an apparatus for testing the same for faults, the illustration showing hidden faults and Figure 2 illustrates the same structure after testing, illustrating substantially the manner in which the faults are brought to the internal surface so as to be readily ascertainable by casual inspection.

Referring to the drawing, there is illustrated in Figure 1 a cylindrical tubular object 10 arranged for test by electromagnetic induction. For such tests an induction heating head 12 is employed, the same comprising a plurality of turns 14 constituting an inducing coil and a magnetic core 16 cooperating therewith in order to assist in the concentration of flux, whereby heavy currents and intense heat may be generated within the internal wall and adjoining internal layers of the cylinder 10. The structure of such a heat treating head is illustrated more in detail in Patent No. 2,281,333, granted April 28, 1942. Through the use of high frequency current the heating is confined to the internal surface and adjoining layers, the depth of heating being controlled by the frequency, the amount of power induced within the tubular structure as well as the rate of relative movement between the induction head and the tubular structure.

The generation of heavy currents in the internal wall and adjacent internal layers of the tubular member 10 being progressed uniformly along the length of the tube will, upon striking a high resistance sand hole or pocket such as 20 hidden from the surface by a layer of homogeneous metal such as 22, cause a burn-out resulting from fusion at the point, thus breaking down the internal wall of the tubular object and disclosing the presence of the hidden danger. It will be appreciated that this is due to the fact that, because of the high frequency currents and skin effect, the current is urged to flow in the surface layers and to a controlled depth. Consequently, if the surface layer at any particular point becomes thinner than the surface layers present for the conduction of the high frequency currents at other points, the thinner layer will be overheated and caused to fuse and burn out. Thus, if the heating currents are caused to flow to a depth as indicated at 24 in the internal surface layers of the tubular object, they will upon striking the hidden sand pocket 20 and being restricted to the thin sand hole concealing surface layer 22 be caused to concentrate unduly and promptly fuse or burn the surface and disclose the existence of the dangerous sand hole immediately therebehind. This effect is illustrated in Figure 2 at 20'.

Thus it is possible by controlling the frequency and regulating the power induced in the tube as well as the speed of movement of the induction heat treating head, to fault test to any particular depth. For example, if the tubular object were only desired to be tested to a depth equal to substantially the thickness of the wall 22 hiding the sand hole 20, it will appear that the same would not become exposed for the reason that overheating would not result at this point for the skin currents would be adequately carried, but if it is desired to be assured of the fact that the structure of the cylinder is homogeneous to a depth exceeding that of the thickness of the wall 22 hiding the sand hole, then by the proper selection of speed of relative movement, frequency and power such sand holes are readily exposed. The presence of internal microscopic and practically invisible cracks such as 28 is also exposed by such treatment since the same become enlarged as illustrated in Figure 2 at 28'.

In order that such testing may be effected from end to end without interruption or end effect, radially laminated magnetic core end pieces 30 and 32 may be applied to the end of the tubular object 10, thereby permitting the test to be continued up to and including the tip ends of the structure.

It will readily appear that the invention will also show up faulty seams such as might exist in seam welded pipe for the reason that the faults in such seams generally are constituted by porosity and generally high resistant portions where the seam is defective, and thus the principles above referred to would be applicable and faults thereby discovered.

Through the concentration of high frequency currents in the inner layers and to a prescribed depth whereby the tube is heated differentially, the internal layers being heated to a desired temperature so rapidly that the outer layers are substantially unaffected, the inner layers may be caused to expand thermally and thereby stress the outer layers in tension. The differential effect may be so adjusted as to create any desired stress in the outer layers which stress would be sufficient to rupture the tube if there should be a point of weakness therein which would not stand the stress imposed.

It will be readily seen that this operation may be progressively effected and that stress so imposed is momentary and only exists so long as the differential heat remains, the stress gradually diminishing as the heat applied to the internal layer soaks into the outer layers. After the tube has been so treated it will be generally found to have been annealed and such residual stresses as may have been present may be considerably reduced in this way at the same time.

While such fault testing exaggerates the fault in a manner so as to render the object generally not usable, it is, of course, preferable that such defective objects be discovered so that they may be discarded. In the event that no faults are disclosed by such tests the heating and subsequent slow cooling in air or in such other manner as desired will be found not to be detrimental.

There has thus been described a simplified process of testing the walls of tubular structures for adaptability to conditions wherein defects would be detrimental; for example, in internal combustion engine cylinder wall structures where wear gradually removes a certain amount of the metal, the presence of dangerous pockets which might be opened up by such wear is discovered.

Though the invention has been illustrated and described with reference to one application thereof, it is to be understood that the same is not limited thereto but may be practiced in other equivalent ways without departing from the spirit of the invention. Accordingly, reference will be had to the appended claims for a definition of the limits of the invention.

What is claimed is:

1. The method of visually discerning in metallic articles capable of being heated by electromagnetic induction the presence of flaws hidden beneath the surface thereof, which consists in selecting a surface layer of predetermined depth in which detrimental hidden flaws may be spaced from the article surface by metal of a thickness less than said predetermined depth, producing visible surface indications of such flaws by electromagnetically inducing in said surface layer high-frequency, high-power heating currents of such character as to normally penetrate said layer to its full depth and in the presence of and adjacent such hidden flaws to be restricted to the metal of lesser thickness between said flaws and said surface, said induced currents being sufficient to heat the metal of lesser thickness to a temperature sufficiently higher than that of the adjacent flawless metal in said layer as to fuse said metal of lesser thickness and cause the same to burn out whereby to visually indicate at such surface the presence of such flaws, then cooling the metal while so controlling the cooling operation as to substantially avoid hardening or annealing effects, and then visually inspecting the article surface to discern the presence of such flaw indications.

2. The method of visually discerning in annular metallic articles capable of being heated by electromagnetic induction the presence of structural flaws and defects not obvious upon the surface thereof, which consists in producing visible surface indications of such flaws and defects by electromagnetically inducing in an inner annular surface layer of predetermined depth high-power, high frequency, electric heating currents of such character that said inner surface layer is caused to expand sufficiently and with sufficient rapidity to stress the surrounding relatively unheated material to such a degree as produces visible cracks in the surface thereof at places where the normal strength of said surrounding material is impaired by the presence of structural flaws and defects, then cooling the article while so controlling the cooling operation as to substantially avoid hardening or annealing effects, and then visually inspecting the article surface to discern the presence of flaw indicating cracks.

3. The method of visually discerning in an annular metallic article capable of being heated by electromagnetic induction the presence of structural flaws and defects not obvious upon the surface thereof, which consists in producing visible surface indications of such flaws and defects by selecting an inner surface layer of predetermined depth in which detrimental hidden flaws may be spaced from the article surface by metal of a thickness less than said predetermined depth, electromagnetically inducing in said surface layer, high-frequency, high-power heating currents of such character as to normally penetrate said layer to its full depth and in the presence of an adjacent to said hidden flaws to be restricted to the metal of lesser thickness between said flaws and said surface, said induced currents being sufficient to heat the metal of lesser thickness to a temperature sufficiently higher than that of the adjacent flawless metal in said layer as to thermally change said metal of lesser thickness and cause visually discernible differences in the surface appearance between the area of flawless metal and that adjacent to said flaws whereby to visually indicate at said surface the presence of such flaws, said heating currents also being of such character that said surface layer is caused to expand sufficiently in extent and with sufficient rapidity to stress the surrounding relatively unheated material to such a degree as produces visible cracks in the surface thereof at places where the normal strength of said surrounding material is impaired by the presence of structural flaws and defects, then cooling the article while so controlling the cooling operation so as to substantially avoid hardening or annealing effects, and then visually inspecting the surfaces of the article to discern the presence of such flaw indications.

HOWARD E. SOMES.